US008424204B2

(12) United States Patent  
Geiman

(10) Patent No.: US 8,424,204 B2  
(45) Date of Patent: Apr. 23, 2013

(54) METHOD OF FORMING COMPOSITE POWDER METAL GEAR

(75) Inventor: Timothy E. Geiman, South Lyon, MI (US)

(73) Assignee: GKN Sinter Metals, LLC, Auburn Hills, MI (US)

( * ) Notice: Subject to any disclaimer, the term of this patent is extended or adjusted under 35 U.S.C. 154(b) by 444 days.

(21) Appl. No.: 12/852,856

(22) Filed: Aug. 9, 2010

(65) Prior Publication Data

US 2010/0322812 A1 Dec. 23, 2010

Related U.S. Application Data

(62) Division of application No. 11/277,374, filed on Mar. 24, 2006, now abandoned.

(51) Int. Cl.
*B21D 53/28* (2006.01)
*B21K 1/30* (2006.01)

(52) U.S. Cl.
USPC ...... 29/893.34; 29/893; 29/893.3; 29/893.36; 148/206; 148/211; 148/212; 419/38

(58) Field of Classification Search ............ 29/893, 29/893.34, 893.3, 893.36; 148/206, 211, 148/212; 419/38
See application file for complete search history.

(56) References Cited

U.S. PATENT DOCUMENTS

| | | | |
|---|---|---|---|
| 3,206,996 A | 9/1965 | Shimp | |
| 3,398,444 A | 8/1968 | Nemy | |
| 3,703,108 A | 11/1972 | McCaw | |
| 3,768,327 A | 10/1973 | Dunn et al. | |
| 5,390,414 A | 2/1995 | Lisowsky | |
| 5,613,182 A * | 3/1997 | Lynn | 419/28 |
| 5,903,815 A | 5/1999 | Scott | |
| 5,934,157 A | 8/1999 | Kobayashi et al. | |
| 6,148,685 A | 11/2000 | Cadle et al. | |
| 6,224,508 B1 * | 5/2001 | Nakano | 476/40 |
| 6,457,624 B1 * | 10/2002 | Weihrauch | 227/10 |
| 6,626,576 B1 | 9/2003 | Cadle et al. | |
| 2005/0085331 A1 | 4/2005 | Prucher | |

FOREIGN PATENT DOCUMENTS

| | | |
|---|---|---|
| DE | 1170149 B | 5/1964 |
| DE | 10331631 B3 | 1/2005 |
| EP | 0371340 B1 | 4/1994 |

OTHER PUBLICATIONS

International Search Report for corresponding PCT application PCT/US2007/076182.

* cited by examiner

*Primary Examiner* — Richard Chang  
(74) *Attorney, Agent, or Firm* — Quarles & Brady LLP

(57) ABSTRACT

A forged composite gear and a method of making a forged composite powder metal gear. The forged composite gear includes a plurality of teeth extending from a core, a first section having a first powder metal material, a second section having a second powder metal material and a variable boundary profile. The variable boundary profile is formed between the first section and the second section, whereby said variable boundary profile exhibits greater tooth wear resistance on the teeth and greater impact resistance in the core.

18 Claims, 3 Drawing Sheets

METHOD OF FORMING COMPOSITE POWDER METAL GEAR

CROSS-REFERENCE TO RELATED APPLICATIONS

This application is a divisional patent application of U.S. non-provisional patent application Ser. No. 11/277,374 filed Mar. 24, 2006 now abandoned, which is hereby incorporated by reference as if set forth in its entirety herein.

TECHNICAL FIELD

The invention relates to a forged powder metal part and more particularly to a composite powder metal variable boundary part, including a method of manufacture thereof.

BACKGROUND OF THE INVENTION

There is continuing demand for manufacturing processes that may lessen the cost, time or steps in producing a part. More often than not, the benefits resultantly associated with improving the manufacturing process are necessitated in the first instance by customer requirements to develop and improve products to have superior dimensional, mechanical and/or performance properties. For instance a typical differential side gear may have any or all of the following performance requirements such as: the spline area requiring dimensional precision, high shear strength and brinnelling resistance; the hub and thrust faces requiring dimensional precision, surface finish and case compatibility; the gear geometry requiring dimensional precision, surface finish and optimised profile; and the tooth and core strength may require impact resistance, wear resistance, spalling resistance, and different surface and core metallurgies. Different non-compatible manufacturing processes, i.e. casting, steel forging or powder metal forging, obtain different performance requirements for the same part, advantageously or otherwise.

Referring to FIG. 1, in order to meet some of these performance requirements, a gear 10 is made by forging a powder metal 14 and then case carburizing the gear to achieve a nearly constant effective case depth 16. The case depth 16 for each gear tooth 12 is shown in the partial cross-sectional view of FIG. 1. However, a case carburized gear does not necessarily achieve the desired mechanical properties such as enhanced tooth wear and fatigue strength while providing beneficial performance characteristics in the body of the gear that could beneficially result if the part was made from composite materials. It would be advantageous to achieve an improved balance of these performance requirements in the final product, uncompromised by the manufacturing process thereby saving time, processing or cost.

A manufacturing process to improve the performance requirements of powder metal parts is disclosed in U.S. Pat. No. 5,903,815 titled "Composite Powdered Metal Component." The process teaches a component made from two or more discreet powder metals that are compacted and then sintered. Also, U.S. Pat. No. 6,148,685 titled "Duplex Sprocket/Gear Construction and Method of Making Same," discloses a method of making a gear made from two or more discrete powder metals that are then also compacted and sintered to obtain the final part. These patents only teach composite powdered metal parts obtained by sintering, in general. No known processes exist which address applying composite powder processes to improve performance features such as improved load bearing upon the tooth flank of a gear while providing impact resistance and bending fatigue resistance in the tooth root; providing a composite variable boundary layer; or making a substantially fully dense part by compaction forging.

Therefore, there is a need for a composite powder metal variable boundary part exhibiting improved impact resistance and bending fatigue resistance in the tooth root. It would also be advantageous to provide a composite variable boundary layer or a substantially fully dense part by compaction forging. There is also a need for a method of producing a variable boundary in a composite powder metal part.

SUMMARY OF THE INVENTION

In accordance with the above-mentioned needs, a variable boundary composite powder metal gear exhibiting greater tooth wear resistance on its surface and greater impact resistance in its core is disclosed. The forged composite gear includes a plurality of teeth extending from a core, a first section having a first powder metal material, a second section having a second powder metal material and a variable boundary profile. The variable boundary profile is formed between the first section and the second section, whereby the variable boundary profile provides for greater tooth wear resistance on the teeth and greater impact resistance in the gear core.

BRIEF DESCRIPTION OF THE DRAWINGS

For a more complete understanding of this invention, reference should now be made to the inventive aspects illustrated in greater detail in the accompanying drawings and described below.

DETAILED DESCRIPTION

Figure 1:
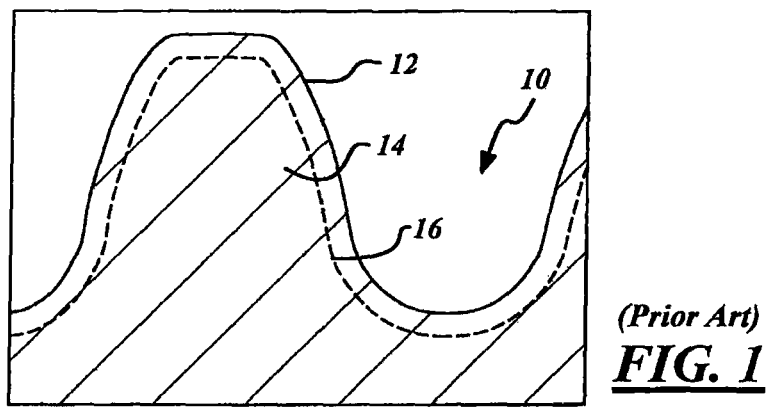
FIG. 1 shows a partial cross-sectional view of a case carburized gear according to the prior art.

In all figures, the same reference numerals are used to identify like parts in the various views. Thus, simultaneous reference to the various figures is appropriate. In some instances, for clarity, equivalent parts in different figures may have different reference numbers.

Figure 2:
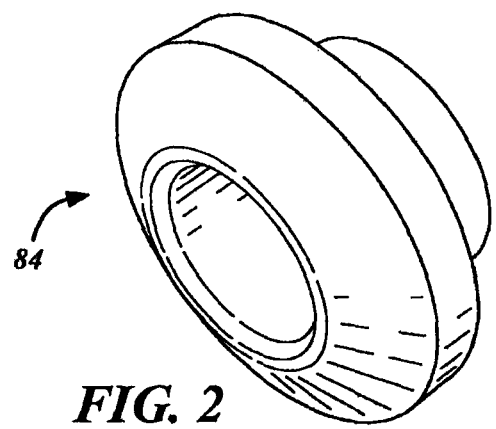
FIG. 2 shows an isometric view of a composite preform made after compacting and sintering required to obtain the inventive product after forging in accordance with an embodiment of the invention.

FIG. 2 shows an isometric view of a composite preform 84 made after compacting and sintering required to obtain the inventive product after forging in accordance with an embodiment of the invention.

Figure 3:
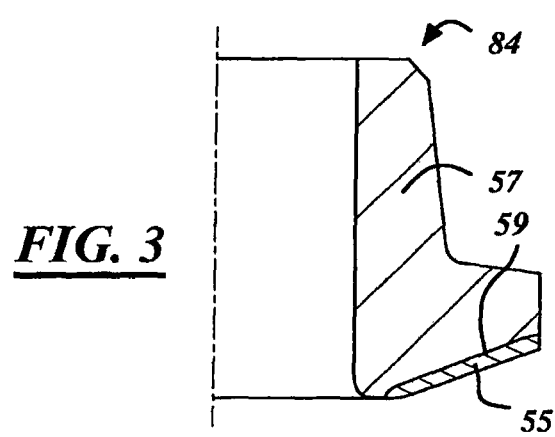
FIG. 3 shows a partial cross-sectional view of the composite preform of FIG. 2 having a composite material.

FIG. 3 shows a partial cross-sectional view of the composite preform 84 of FIG. 2 having a composite material. The preform 84 includes a first powder metal material 55 and a second powder metal material 57 separated by initial material boundary 59. The initial material boundary 59 is representative of the boundary between at least two materials obtained after a compacting process of strategically filled or placed powder metals into a compaction die. While the initial material boundary 59 is shown as a precise demarcation between the different materials 55, 57, the actual material boundary line will approximate the separation of the materials depending upon the filling process used to create the composite preform. The art of filling a compaction die with different powder metals to obtain a composite preform is known to those skilled in the art, but is only briefly introduced for an understanding of the invention presented herein.

Figure 4:
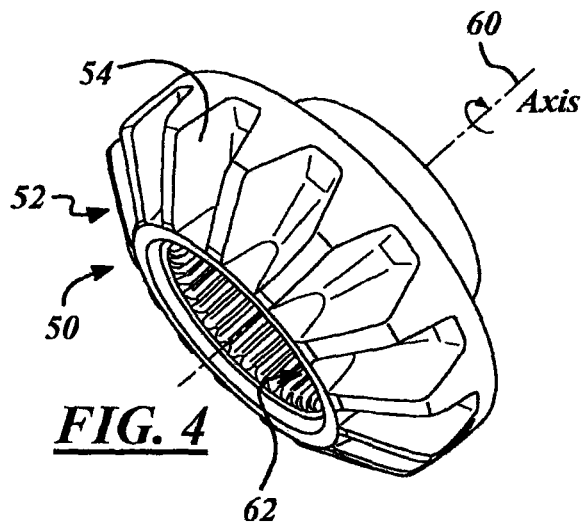
FIG. 4 shows an isometric view of a differential side gear made from the composite preform of FIG. 2 in accordance with an embodiment of the invention.
Figure 6:
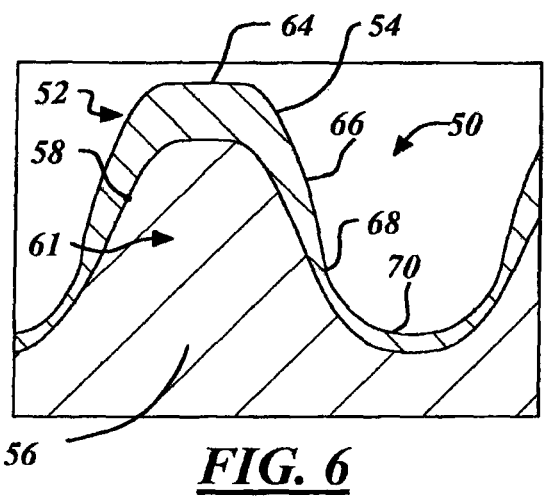
FIG. 6 shows a partial cross-sectional view of the differential side gear shown in FIG. 5.

FIG. 4 shows an isometric view of a differential side gear 50 made from the composite preform 84 of FIG. 2 in accordance with an embodiment of the invention. The differential side gear 50 includes plurality of teeth 52 having a variable boundary profile 58 as shown in FIG. 6 and described herein. Each tooth of the plurality of teeth 52 has a first surface 54 and a tooth core or root 56. The differential side gear 50 has a rotational axis 60, wherein the teeth 52 extend radially outward in the same general direction as the rotational axis of the gear, but are inclined with respect to the rotational axis. The differential side gear 50 further includes an axially splined internal section 62 axially aligned with the rotational axis 60. The differential side gear 50 is made by compaction forging the composite preform 84.

Figure 5:
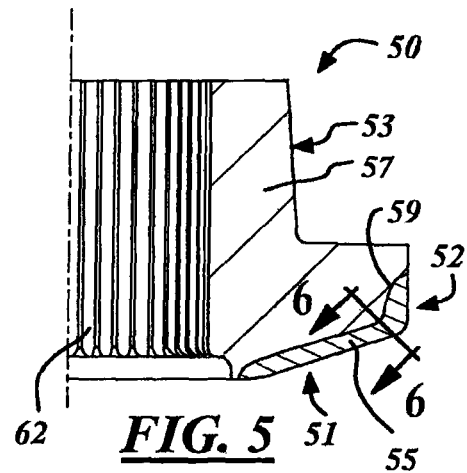
FIG. 5 shows a partial-cross sectional view of the differential side gear shown in FIG. 4.

FIG. 5 shows a partial-cross sectional view of the differential side gear 50 shown in FIG. 4. The differential side gear 50 after forging results in a first section 51 made from a first powder metal material 55, and second section 53 made from a second powder metal material 57. Also, the gear 50 includes a variable boundary profile 58 as shown in FIG. 6. The variable boundary profile 58 exhibits the performance properties mentioned above, while not necessarily being formed from a carburized zone, but being formed from the initial material boundary 59 created by the forging of the composite materials 55, 57. The variable boundary profile 58 in the gear exhibits improved tooth wear resistance or loading on the plurality of teeth 52 and improved impact or bending resistance in the gear core 56. Also, the second powder metal material 57 may be chosen advantageously to obtain preferential performance properties for the splines 62 of the gear 50 while advantageously maintaining the performance properties desired at the teeth 52.

Optionally, a composite material may be strategically utilized for each material section. Also, additional or multiple material sections may be utilized in a preform in order to obtain multiple composite variable boundary profiles on select portions of a final forged part or gear, thereby obtaining select performance features.

FIG. 6 shows a partial cross-sectional view of the differential side gear 50 shown in FIG. 5. The differential side gear 50 includes a composite variable boundary profile 58. The variable boundary profile 58 may be coincidental with the initial material boundary 59 in a particular cross-sectional view, such as that represented in FIG. 5, but the initial material boundary 59 is not determinative of the variable boundary profile 58 as shown in FIG. 6.

The first surface 54 of the gear 50 includes a tip surface 64, a pitch line surface 66, a root fillet surface 68 and a root diameter or land surface 70. The variable boundary profile 58 is substantially represented by the effective boundary of: 2.4 mm at the tip surface; 1.9 mm at the pitch line surface; 0.4 mm at the root fillet surface; and 0.8 mm at the root land surface. While specific numbers are presented in the present embodiment, it is recognized that the variable boundary profile may have any non-constant effective boundary profile over a particular surface cross-section and is not limited to the specific profile here presented and is not intended to be limited by the example here given.

The variable boundary profile 58 may also be represented by a boundary ratio. The effective boundary ratio is given by comparing boundary depths measured at the tip surface 64 to the root fillet surface 68, the pitch line surface 66 to the root fillet surface 68, or the root land surface 70 to the root fillet surface 68. For example, the variable boundary ratio for the tip surface 64 to the root fillet surface 68 is 6:1, the pitch line surface 66 to the root fillet surface 68 is 19:4, and the root land surface 70 to the root fillet surface 68 is 2:1.

Advantageously, the boundary ratio may be 6:1 over the variable boundary profile 58 from the greatest depth to the shallower depth, thereby achieving greater mechanical properties such as tooth wear and impact resistance as desired.

Moreover, it is desirable to select a first powder metal material 55 for the first surface 54 of the teeth 52 achieving a surface hardness of at least 58 HRC in the forged gear. It also may be desirable to have a second powder metal material 57 in the gear core 56 having a hardness of not more than 43 HRC. In this regard, the second powder metal material is selected having effectively a non-hardening material such a low ferrous alloy steel having less than 0.2% carbon and the first powder metal material is a hardening material made from a different ferrous steel having a higher carbon content.

The variable boundary profile 58 advantageously provides a gear having greater tooth wear resistance on the first surface 54 while providing impact resistance in the tooth root 56 or improved shear resistance in the spline 62. The variable boundary profile 58 is representative of the effective boundary profile achieved by strategic compaction forging of a preform. The variable boundary profile 58 resultantly achieved by the forging process as discussed herein.

While the process is described with respect to a differential side gear 50, it is anticipated that the variable boundary profile 58 may be achieved on other parts or gears, including bevel, differential or pinion gears, without limitation.

The differential side gear 50 may be made from a low alloy, fully compacted, ferrous powder metal material for one of the material portions. However, it is anticipated that the gear may be made of various other types of forged powder metal steels.

Figure 7:
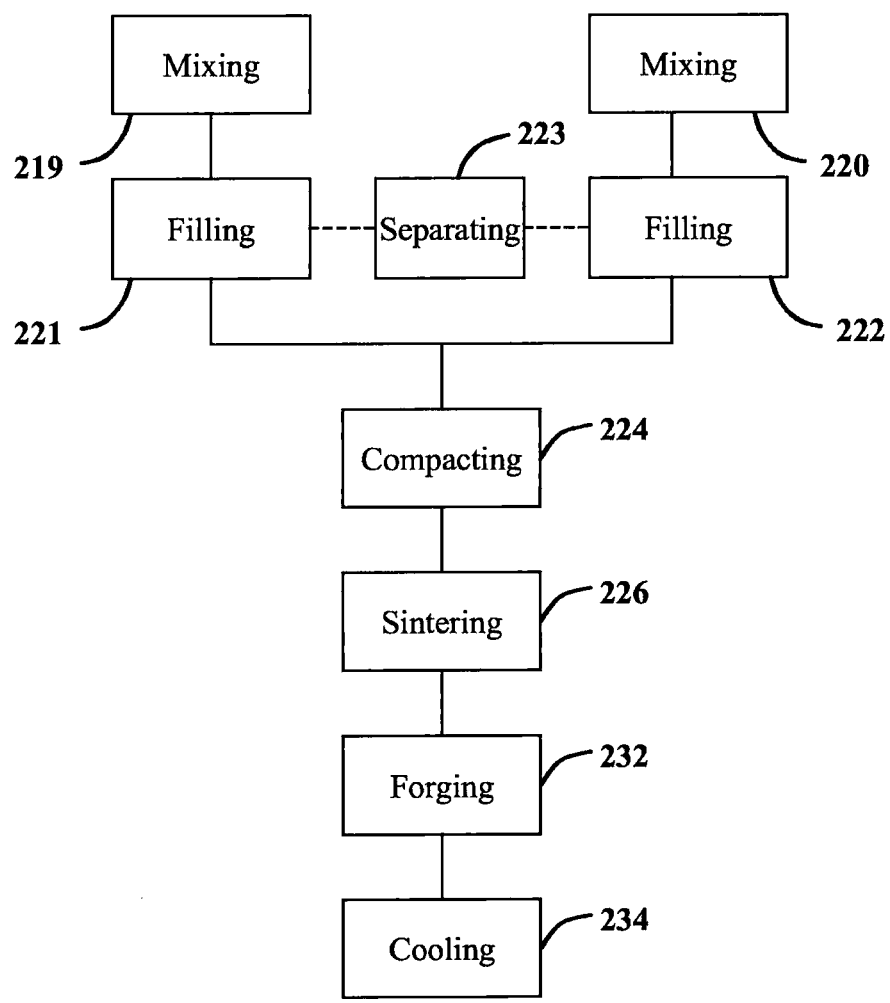
FIG. 7 shows a schematic layout of an embodiment of a process according to the invention to obtain a composite powder metal variable boundary part.

Turning to the method of making the inventive variable boundary powder metal gear 50, FIG. 7 shows a schematic layout of an embodiment of a process according to the invention to obtain a composite powder metal variable boundary part. The process begins with step of mixing 219, 220, wherein each material is prepared for filling into a compaction form. Then the process continues with the step of filling 221, 222, wherein each material is strategically placed into the compaction form. Then after the filling step is completed the process continues with the steps of compacting 224, sintering 226, forging 232, and cooling 234. Post forging operations (not shown) may also be used to further enhance the gear. For brevity, and because some of these process steps are known to those in the art of forging powder metals, only certain aspects of the inventive process are discussed below. In this regard, material selection, temperature processing and compaction pressures are discussed only briefly.

The mixing step 219, 220 readies each metal powder, including any needed binders or lubricants, by mixing the material until a nearly uniform mixture is achieved ready for filling into a compacting form during the filling step 221, 222. An optional step of separating 223 may be included during the filling steps 221, 222 thereby facilitating the material placement into the compaction form. While two mixing steps 219 and 220, and two filling steps 221 and 222 are shown, it is recognized that additional mixing or filling are necessary for each additional material desired. The filling steps 221, 222 can be sequentially such that the material 55 for the first surface 54 is strategically placed in the preform prior to the material 57 for the second surface 56, for example. In some cases, however, the filling steps 221, 222 may be simultaneous or nearly simultaneous.

The compacting step 224 includes the compaction of at least two different powder metal materials in a compaction form to obtain a preform. Before compacting, filling of a first portion of the compaction form with a first powdered metal material, then, with optional use of a separator 223, filling a second portion of the compaction form with a second powdered metal material. After the filling step of the die cavity is complete, the composite metal powders are compacted within the die cavity to form a preform. The preform includes at least one cross-sectional surface in which the final forged part resultantly obtains a variable boundary profile, as discussed herein. The process is then completed by sintering, forging and cooling steps to achieve a gear having a first section having the first powder metal material and a second section having the second powder metal material. It is noted that the first and second portions in the filling stage resulting in a preform, do not necessarily achieve the same boundary as a first and second sections of the final product.

The sintering step 226 may be accomplished as is known by a person of skill in the art. Optionally, if one of the composite materials is conducive to carburization or "sint-carb" processing, as is know in the art, then the material may include a carburization step to achieve further beneficial results prior to the forging process.

The variable forging or forging step 232 comprises forging the preform at a forge temperature and a forge pressure to obtain a substantially dense, net shape, part. The variable boundary profile for the gear results in nearly symmetrical profiles for each tooth because of the symmetrical nature of the forging process and the symmetrical nature of the preform. However, it is recognized that optional carburization steps or additional forging steps may be used to obtain multiple variable boundary profiles. The variable boundary profile is achieved by utilizing a die set of the forge to variably enhance critical flow of the different metal portions during the forging process. Essentially, the determined boundary of the composite powder metal preform is strategically compressed into the die sections, wherein portions of the preform are stretched and thinned during forging and other portions of the preform are thickened and deepened achieving the different powder metal zones from the composite preform.

In one aspect, the forging step used to obtain the composite variable boundary profile is further enhanced by strategically forming the material boundary layer in the preform to enhance critical flow of the composite powder metal preform during the forging process.

The cooling step 234 allows the forged part to obtain a particular metallurgy resulting in a gear having the desired variable boundary profile. Cooling of the forged part may be by quenching in oil, water, air or by other methods suitable to the powder metal forging process.

Prior to cooling, an optional dwelling step may be included, allowing the forged part to dwell for a period allowing for enhanced properties by allowing the material temperature to stabilize in the part.

Optionally, a preheating step may be included wherein the preform is heated to a pre-forge temperature prior to forging to enhance the desired metal flow during the forging process.

Further, optional post forging operations may include, turning, facing, surface grinding, splining, and broaching of the product depending upon final specification requirements, thereby being ready for washing, packing, or shipping. Because of the multi-material work piece, the finish class of these steps can be improved. For example, a higher spline class is achievable for the spline 62 of FIG. 4 because of the non-hardened second material 57. This improves the entire machining system by improving the spline class, yet reducing tool wear.

With proper selection and combinations of powder metal, compaction forms, processing times, processing temperatures, processing pressures, forging dies, and cooling method a near-net shape, fully dense product may be obtained having the variable boundary profile, thereby requiring minimal if any machining operations facilitating cost savings and performance improvements.

While various process steps have been presented, they are intended only to be limited in scope or order as indicated in the claims of this invention. Further, while the invention has been described in connection with several embodiments, it should be understood that the invention is not limited to those embodiments. Thus, the invention covers all alternatives, modifications, and equivalents as may be included in the spirit and scope of the appended claims.

What is claimed is:

1. A method of forming a composite powder metal gear from two different powder metal materials, the method comprising:
  filling a first portion of a die cavity with a first powder metal material;
  filling a second portion of the die cavity with a second powder metal material;
  compacting the first powder metal material and the second powder metal material within the die cavity to form a preform, the preform having an initial boundary profile between the first powder metal material and the second powder metal material;
  sintering and thereafter forging the preform, and during forging reshaping the initial boundary profile to obtain the composite powder metal gear having a variable boundary profile.

2. The method of claim 1, wherein the variable boundary profile is formed in a plurality of teeth of the composite powder metal gear.

3. The method of claim 2, wherein the step of forging results in a variable boundary profile that is substantially symmetrical for each of the plurality of teeth.

4. The method of claim 2, wherein the composite powder metal gear is a bevel gear in which the teeth are inclined with respect to an axis of rotation of the gear.

5. The method of claim 2, wherein, as a result of forging, a depth of the variable boundary profile is greater at a tip of a tooth in the plurality of teeth than at a corresponding root of the tooth.

6. The method of claim 5, wherein a tooth fillet is located between the tip and the corresponding root, and a depth of the variable boundary profile at the tooth fillet is less than the depth of the variable boundary profile at the tip and the depth of the variable boundary profile at the corresponding root.

7. The method of claim 1, wherein, during the forging, some portions of the initial boundary profile are stretched and other portions of the initial boundary profile are thinned to produce the variable boundary profile.

8. The method of claim 1, further comprising the step of carburizing prior to forging.

9. The method of claim 1, wherein the variable boundary profile is formed in the initial boundary profile by using a die set of a forge configured to variably enhance critical flow of the first powder metal material and the second powder metal material.

10. The method of claim 1, wherein the first powder metal material and the second powder metal material are different materials.

11. The method of claim 10, wherein the different materials are different low alloy ferrous materials.

12. The method of claim 10, wherein the different materials have different conduciveness to carburization.

13. The method of claim 10, wherein the different materials have different hardenabilities.

14. The method of claim 1, wherein filling includes the step of inserting a separator into the die cavity that separates the first powder metal material from the second powder metal material and further including the step of removing said separator from the die cavity prior to compacting.

15. The method of claim 1, wherein the composite powder metal gear formed after forging is substantially dense and near net shape.

16. The method of claim 1, wherein the step of compacting occurs in a press in a uniaxial direction.

17. The method of claim 1, wherein the variable boundary profile is continuous.

18. The method of claim 1, further comprising the step of preheating the preform prior to forging to enhance a flow of the first powder metal material and the second powder metal material during forging.

* * * * *